(12) United States Patent
Yu et al.

(10) Patent No.: US 7,270,489 B2
(45) Date of Patent: Sep. 18, 2007

(54) OPTICAL TRANSCEIVER

(75) Inventors: Juhyun Yu, Hitachi (JP); Hidetaka Kawauchi, Hitachi (JP); Kinya Yamazaki, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 11/451,321

(22) Filed: Jun. 13, 2006

(65) Prior Publication Data

US 2007/0058911 A1 Mar. 15, 2007

(30) Foreign Application Priority Data

Sep. 13, 2005 (JP) ............... 2005-265298

(51) Int. Cl.
*G02B 6/36* (2006.01)
(52) U.S. Cl. .......................... 385/89; 385/92
(58) Field of Classification Search ................ 385/14, 385/49, 88–94
See application file for complete search history.

(56) References Cited

U.S. PATENT DOCUMENTS

2004/0197056 A1 10/2004 Oki

2005/0286839 A1* 12/2005 Yoshikawa ............... 385/92
2006/0204183 A1* 9/2006 Ishikawa .................. 385/88
2006/0215970 A1* 9/2006 Mizue et al. .............. 385/92

FOREIGN PATENT DOCUMENTS

JP 2004-103743 4/2004

* cited by examiner

*Primary Examiner*—Hemang Sanghavi
(74) *Attorney, Agent, or Firm*—McGinn IP Law Group, PLLC

(57) ABSTRACT

An optical transceiver has: an optical subassembly (OSA) having a built-in optical element and a cylindrical receptacle to conduct an optical path from the optical element; a chassis having an entrance that allows insertion of an optical fiber to be connected to the optical path; an OSA holder engaged with the receptacle to hold the OSA and accommodated in contact with an inside portion of the chassis; and an OSA holder-regulating portion formed in the chassis to regulate the OSA holder, the OSA holder-regulating portion being positioned opposite the entrance relative to the OSA holder.

4 Claims, 5 Drawing Sheets

US 7,270,489 B2

OPTICAL TRANSCEIVER

The present application is based on Japanese patent application No.2005-265298, the entire contents of which are incorporated herein by reference.

BACKGROUND OF THE INVENTION

1. Field of the Invention

This invention relates to an optical transceiver, which has an optical subassembly (herein called OSA) accommodated in a chassis, that can enhance accuracy for positioning the OSA.

2. Description of the Related Art

Optical transceivers comprise an OSA equipped with a built-in optical element for optical transmission/reception, accommodated in a chassis. In detail, the OSA comprises an optical module with optical elements accommodated in a package together with lenses and lead wires for electrical signals, and a cylindrical receptacle attached to be integral with the optical module. The optical transceiver is constructed such that the OSA is accommodated and fixed in the chassis with an entrance for an optical fiber formed therein. A position where to place the OSA is important because it influences quality of optical coupling between an optical path and the optical fiber. Although the position includes a position in a longitudinal direction of the optical path and a position in an orthogonal direction to the optical path, the position in the longitudinal direction of the optical path will mainly be described below.

To place the OSA at a proper position in the chassis, an OSA holder is used. The OSA holder engages a receptacle to hold the OSA, and is accommodated in contact with an inside portion of the chassis. Specifically, the OSA holder contacts a proper inside portion of the chassis so that its position is regulated and thereby determined in the chassis, while the receptacle is held by the OSA holder so that its position relative to the chassis is determined (see JP-A-2004-103743).

In the optical coupling between an optical path from the optical element and an optical fiber, of factors of positional mismatch in the longitudinal direction of the optical path, as the factors resulting from an optical transceiver, there are errors such as positional error of OSA fitting relative to a chassis, dimensional error (also called dimensional tolerance) of an OSA holder itself, positional error of OSA holding relative to an OSA holder, dimensional error of an OSA itself, etc. The more the number of parts involved in position determining, the more the dimensional and relative positional errors of the parts increase.

The discrete errors of the optical transceiver are 0.1 mm or less. However, the plural error factors combine together to cause an increase in total error, and therefore large positional mismatch unfavorable to optical coupling.

SUMMARY OF THE INVENTION

Accordingly, it is an object of the invention to provide an optical transceiver that can enhance the OSA-positioning accuracy.

(1) According to one aspect of the invention, an optical transceiver comprises:

an optical subassembly (hereinafter referred to as OSA) comprising a built-in optical element and a cylindrical receptacle to conduct an optical path from the optical element;

a chassis comprising an entrance that allows insertion of an optical fiber to be connected to the optical path;

an OSA holder engaged with the receptacle to hold the OSA and accommodated in contact with an inside portion of the chassis; and an OSA holder-regulating portion formed in the chassis to regulate the OSA holder, the OSA holder-regulating portion being positioned opposite the entrance relative to the OSA holder.

In the above invention (1), the following modifications and changes can be made.

(i) The receptacle comprises a positioning flange, the OSA holder comprises a mated flange to sandwich the positioning flange, and the mated flange comprises an inclined end face.

(ii) The receptacle comprises a positioning flange, the OSA holder comprises a mated flange to sandwich the positioning flange, and the positioning flange comprises an inclined end face.

(iii) The optical transceiver further comprises: an elastic member interposed between the OSA holder and the entrance, wherein the elastic member allows the OSA holder to be pressed against the OSA holder-regulating portion.

(v) The elastic member comprises a metallic leaf spring.

ADVANTAGES OF THE INVENTION

The optical transceiver according to the invention exhibits the excellent effect of being able to enhance OSA-positioning accuracy.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First embodiment

Construction of Optical Transceiver

Figure 1:
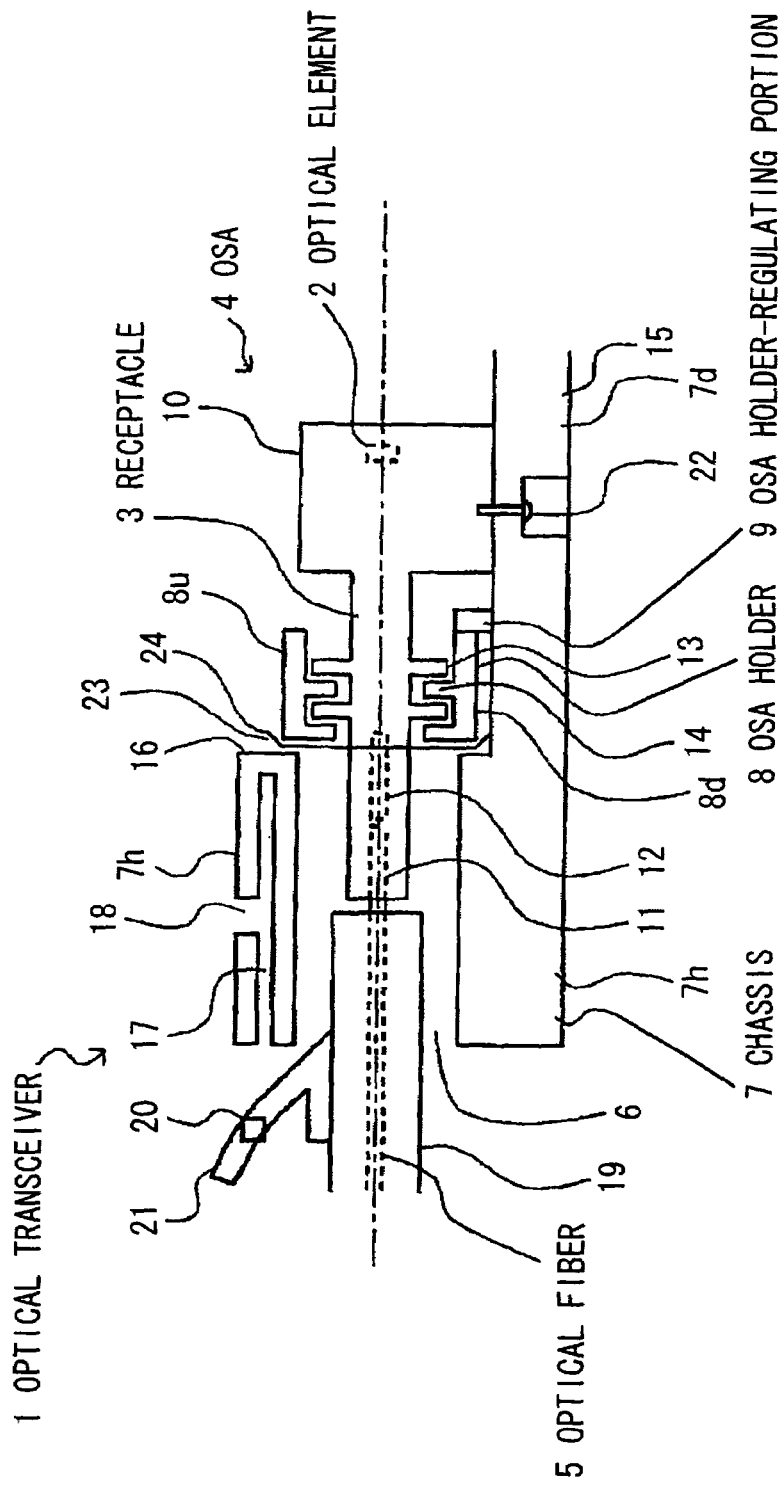
FIG. 1 is a partial sectional side view showing an optical transceiver in a first preferred embodiment according to the invention.

As shown in FIG. 1, an optical transceiver 1 according to the invention comprises an optical subassembly (OSA) 4 equipped with a built-in optical element 2 and with a cylindrical receptacle 3 for conducting an optical path from the optical element 2, a chassis 7 with an entrance 6 formed for inserting an external optical fiber 5 to be connected to the above-mentioned optical path, an OSA holder 8 engaged with the receptacle 3 for holding the OSA 4 and accommodated in contact with an inside portion of the chassis 7 for accommodating and fixing the OSA 4 in the chassis 7, and an OSA holder-regulating portion 9 formed in the chassis 7 so as to be positioned opposite the entrance 6, i.e., on the right side in FIG. 1, relative to the OSA holder 8, to regulate the OSA holder 8.

OSA

Specifically, the OSA 4 is constructed by integrally attaching the cylindrical receptacle 3 to an optical module 10 that comprises the optical element 2 accommodated in a rectangular parallelepiped package, together with lenses (not shown) and lead wires for electrical signals (not shown). A fore-end portion of the cylindrical receptacle 3 is arranged in the entrance 6. Also, the receptacle 3 has a hole 11 at its fore-end for inserting the external optical fiber 5. On the other hand, the receptacle 3 has a built-in ferrule 12 at its base end which forms a portion of the optical path from the optical element 2. To enhance optical properties of the optical transceiver 1, it is important to optically couple this ferrule 12 and the inserted external optical fiber 5 with low loss.

Receptacle

The receptacle 3 is formed with two positioning flanges 13. The positioning flanges 13 have a diameter that is enlarged in longitudinal portions of the receptacle 3. Here, the entrance 6-side and opposite end faces of each positioning flange 13 are both perpendicular to the axis of the receptacle 3 (i.e., the optical axis of the optical path, indicated by a broken line).

OSA Holder

The OSA holder 8 is formed with two mated flanges 14 for sandwiching the positioning flanges 13 therebetween. The OSA holder 8 has substantially the same-size cylindrical space as that of the receptacle 3. The diameter of the cylindrical space is partially narrowed so that the mated flanges 14 alternately mesh with the positioning flanges 13. The entrance 6-side and opposite end faces of each mated flange 14 are both perpendicular to the axis of the cylindrical space (i.e., the optical axis of the optical path, indicated by a broken line)

The OSA holder 8 is divided to form two upper and lower pieces 8u and 8d (where "upper" and "lower" of the optical transceiver 1 refers to "upper" and "lower", respectively, of the figure, for convenience), so that the upper and lower pieces 8u and 8d are fitted around upper and lower semi-circumferential portions, respectively, of the receptacle 3.

Chassis

The chassis 7 comprises a lower chassis 7d with a U-shaped cross section formed integrally by a bottom plate 15 for providing a bottom for mounting the optical subassembly 4 and the OSA holder 8, and both sidewalls not shown, and a lid-shaped upper chassis (not shown) for closing the upper portion of the lower chassis 7d after the optical subassembly 4 and the OSA holder 8 are accommodated in the lower chassis 7d. By closing the upper portion of the lower chassis 7d, the upper piece 8u of the OSA holder 8 is held down from above by the upper chassis.

A head 7h surrounding the entrance 6 is portion of the chassis 7, and is formed integrally with the lower chassis 7d. The bottom of the head 7h, which is a lower side of the entrance 6, is higher than the bottom of the lower chassis 7d, so as to form an entrance 6 side stopper surface 16. The ceiling of the head 7h, which is an upper side of the entrance 6, is lower than the upper chassis, so as to form the entrance 6 side stopper surface 16. The entrance 6 side stopper surface 16 provides a limit for the OSA holder 8 to slide toward the entrance 6.

In the head 7h is formed an engagement hole 18 cut between slides 17 and 17 which extend parallel to the optical axis. In correspondence to this, a prism-shaped connector 19 mounted at an end of the external optical fiber 5 is formed with an elastic lever 21 having a protruding portion 20. When the connector 19 is inserted into the entrance 6, the protruding portion 20 engages the engagement hole 18 to lock the connector 19 in the chassis 7. Although the elastic lever 21 is drawn as at the different position in FIG. 1, the positions of the engagement hole 18 in the head 7h and of the protruding portion 20 in the connector 19 are regulated so that the connector 19 is positioned to optically couple the external optical fiber 5 to the ferrule 12 with the connector 19 locked in the chassis 7.

In the bottom plate 15 is formed a through-hole for a screw 22. In a package of the optical module 10 of the OSA 4 is formed a female screw. After the OSA 4 and the OSA holder 8 are accommodated and positioned in the lower chassis 7d, the screw 22 is inserted into the aforesaid through-hole. By tightening the screw 22 into a screw hole in the lower surface of the optical module 10, the OSA 4 and the OSA holder 8 are fixed to the chassis 7. The through-hole is desirably an elongated hole parallel to the optical axis.

Elastic Member

An elastic member 23 is interposed between the OSA holder 8 and the entrance 6, for pressing the OSA holder 8 against the OSA holder-regulating portion 9. The elastic member 23 may be formed of a metallic plate, i.e., a leaf spring 24. The leaf spring 24 partially contacts the entrance side stopper surface 16 at one side, and the OSA holder 8 at the other side. The metallic plate is conventionally provided at this location as electromagnetic shield. The metallic leaf spring 24 can serve both as the elastic member 23 and as electromagnetic shield.

Assembly Procedure

Next, the optical transceiver 1 will be detailed with its assembly procedure.

Figure 2:
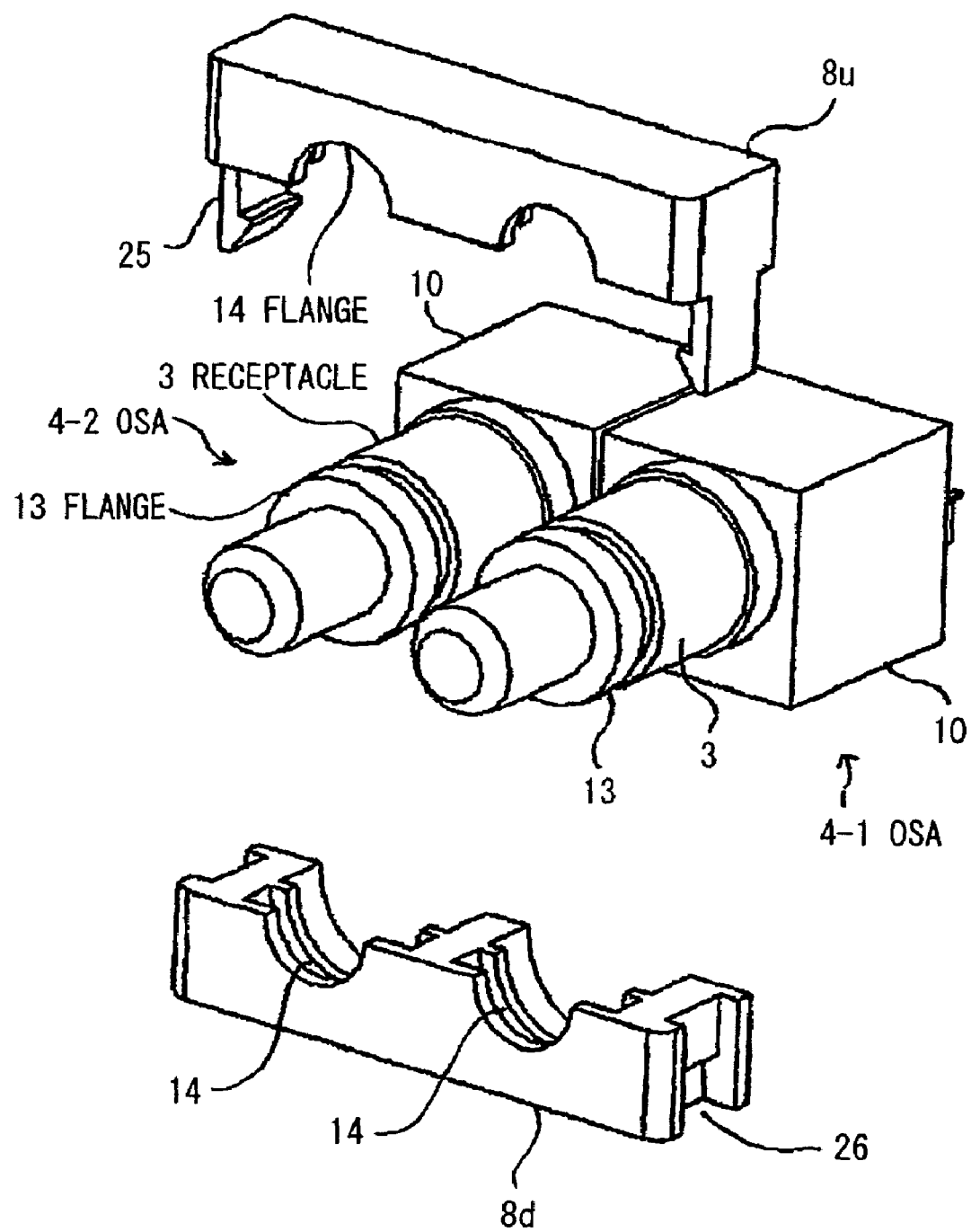
FIG. 2 is a perspective view illustrating assembly of an OSA holder and two OSAs used in the first embodiment.

As shown in FIG. 2, an OSA 4-1 with a built-in transmit laser diode and an OSA 4-2 with a built-in receive photodiode are arranged so that their respective optical axes are parallel to each other. The OSAs 4-1 and 4-2 each have a receptacle 3 integral with an optical module 10. As shown, the optical module 10 and receptacle 3 of the OSA 4-1 are longer in dimension. Both are arranged, however, so that the respective fore-ends of their receptacles 3 are aligned with each other, i.e., the positions of positioning flanges 13 are the same in the direction of the optical axes.

Mated flanges 14 and 14 for the OSAs 4-1 and 4-2 are formed in each of upper and lower pieces 8u and 8d of an OSA holder 8. Also, the upper piece 8u is formed with L-shape hooks 25, and the lower piece 8d with stepped grooves 26. The flanges 13 of the OSAs 4-1 and 4-2 are sandwiched between the respective mated flanges 14 and 14 of the upper and lower pieces 8u and 8d, so that the L-shape hooks 25 engage the stepped grooves 26 respectively to tie up the OSA holder 8, and hold the OSAs 4-1 and 4-2 in the OSA holder 8.

Figure 3:
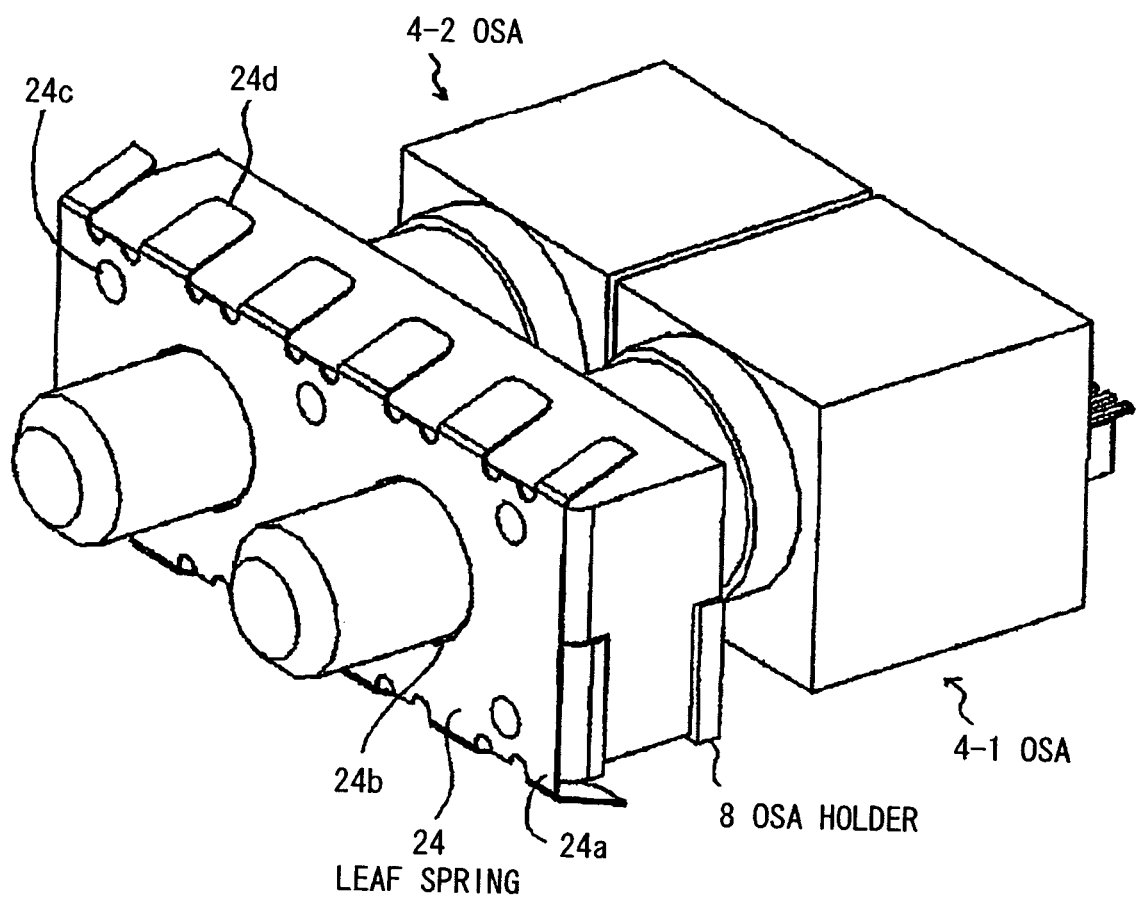
FIG. 3 is a perspective view of an OSA holder and two OSAs assembled together and to which is mounted a leaf spring in the first embodiment.

As shown in FIG. 3, a leaf spring 24 is mounted to the OSA holder 8 in which are held the OSAs 4-1 and 4-2. The leaf spring 24 comprises a shield surface 24a opposite the entrance side surface of the OSA holder 8, two receptacle-inserting holes 24b cut in the shield surface 24a, dimples 24c formed in plural portions of the shield surface 24a, and a comb-toothed portion 24d bent at the upper and lower sides of the shield surface 24a to obliquely protrude therefrom. The comb-toothed portion 24d contacts the bottom plate 15 of FIG. 1 and an upper lid not shown to serve as an elastic member that acts upwardly and downwardly.

The dimples 24c serve as the elastic member 23 for pressing the OSA holder 8 against the OSA holder-regulating portion 9 of FIG. 1. When the thickness of the leaf spring 24 is 50 μm, the height from the front side of the leaf spring 24 to the top of the dimples 24c, (i.e., the amount impressed), may be 50-100 μm, and the distance from the back side of the leaf spring 24 to the top of the dimples 24c, (i.e., the thickness of the elastic member 23) is 100-150 μm.

Figure 4:
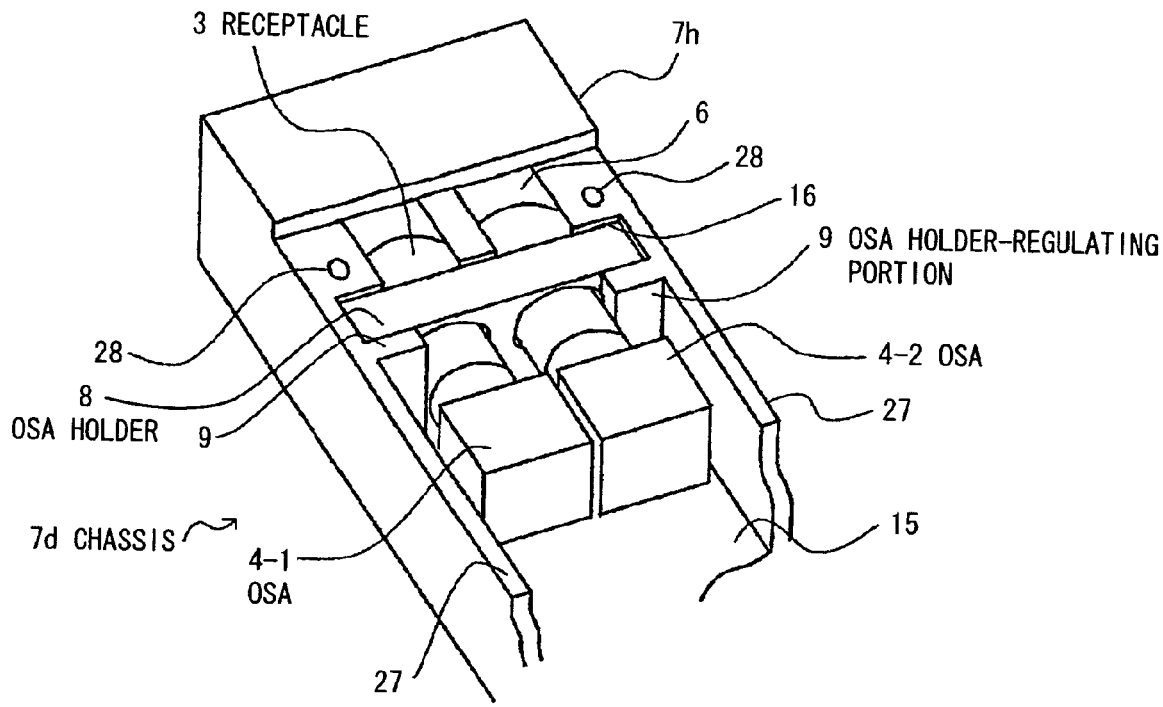
FIG. 4 is a broken perspective view showing a lower chassis of the optical transceiver of the first embodiment.

As shown in FIG. 4, the lower chassis 7d has accommodation space with a U-shaped cross section surrounded by the bottom plate 15 and both sidewalls 27 so that the accommodation space is closed by the head 7h at one end. In the head 7h, an upper portion of the entrance 6 is partially open. In thick portions on both sides of the opening are formed screw holes 28 respectively for fixing an upper lid not shown. On both the sidewalls 27 that extend parallel to the optical axes from the thick portions, there are formed OSA holder-regulating portions 9 respectively that protrude into the accommodation space. Although in FIG. 1 the OSA holder-regulating portion 9 is formed to protrude upwardly from the bottom plate 15, it may be formed to protrude laterally from the sidewalls 27, as shown in FIG. 4.

The OSA holder 8, along with the OSAs 4-1 and 4-2, is accommodated in the accommodation space of the lower chassis 7d. A portion of the receptacle 3, which protrudes forwardly relative to the OSA holder 8, is then accommodated in the entrance 6 from the upper opening of the entrance 6. The OSA holder 8 is interposed between the entrance side stopper surface 16 and the OSA holder-regulating portion 9. Although in this figure the leaf spring 24 is omitted, the leaf spring 24 is actually interposed between the entrance side stopper surface 16 and the OSA holder 8.

After the OSA holder 8, the OSAs 4-1 and 4-2, and the leaf spring 24 are accommodated in the lower chassis 7d, a screw 22 is tightened as in FIG. 1, to fix the optical module 10 to the bottom plate 15 of the chassis 7, and thereby fix the OSA 4 and the OSA holder 8 to the chassis 7.

Effects of the Embodiment

In the optical transceiver 1 thus assembled, the effects of forming the OSA holder-regulating portion 9 of the embodiment in the chassis 7 and of providing the elastic member 23 are as follows.

In the lower chassis 7d the distance between the entrance side stopper surface 16 and the OSA holder-regulating portion 9 is specified by design. Based on the design, manufacture can be done within a predetermined dimensional tolerance range. Similarly, with respect to the length of the OSA holder 8 in the direction of the optical axis, based on length designed, manufacture can be done within a predetermined dimensional tolerance range. The length of the OSA holder 8 in the direction of the optical axis is designed, not to be entirely equal to the distance between the entrance side stopper surface 16 and the OSA holder-regulating portion 9, but to ensure a predetermined clearance. Thus the OSA holder 8 manufactured can be fitted smoothly into the lower chassis 7d manufactured. However, because of the above-mentioned dimensional tolerance and clearance, the OSA holder 8 is not necessarily positioned with high precision.

Accordingly, this embodiment allows the OSA holder-regulating portion 9 to regulate the opposite side of the OSA holder 8 to the entrance 6. Specifically, the OSA holder 8 is brought into contact with the OSA holder-regulating portion 9, and is thereby regulated so as not to recede from the entrance 6. When the OSA holder 8 is brought into close contact with the OSA holder-regulating portion 9, positional errors of the mated flange 14 from the OSA holder-regulating portion 9 is determined only by dimensional errors of the OSA holder 8 itself. Thus it is possible to make small mismatch of the ferrule 12 to designed optical coupling position.

The elastic member 23 also serves to press the OSA holder 8 against the OSA holder-regulating portion 9. Accordingly, the advantage of providing the OSA holder-regulating portion 9 is ensured that there are no errors of attachment position due to separation of the OSA holder 8 from the OSA holder-regulating portion 9.

Second Embodiment

Figure 5:
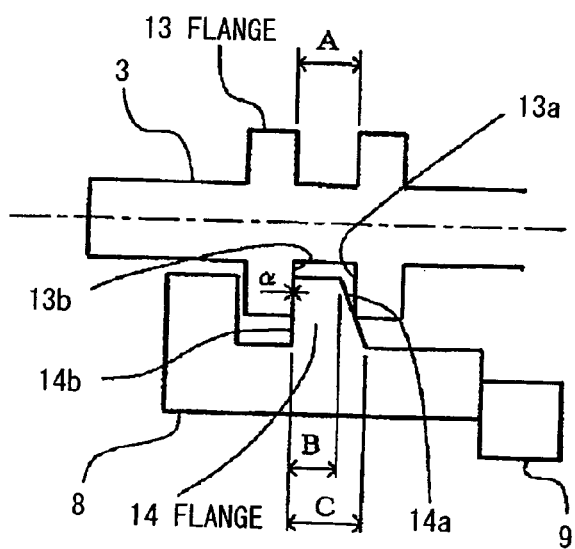
FIG. 5 is a sectional side view showing an OSA holder and an OSA in a second preferred embodiment according to the invention.

FIG. 5 is a sectional side view showing an OSA holder and an OSA in the second preferred embodiment according to the invention.

Although in FIG. 1 the positioning flange 13 of the receptacle 3 and the mated flange 14 of the OSA holder 8 have end faces all perpendicular to the optical axis, a particular end face is provided to be inclined in this embodiment.

As shown in FIG. 5, two positioning flanges 13 of a receptacle 3 have end faces all perpendicular to the optical axis. But one of two mated flanges 14 of an OSA holder 8 has an OSA holder-regulating portion 9 side end face 14a that is formed to be inclined, so that the one mated flange 14 is tapered. For this reason, the shorter the distance from the end face 14a to the axis of the receptacle 3, the larger the spacing between the end face 14a to an end face 13a of the positioning flange 13 gradually becomes. The OSA holder 8 is shown as the lower piece 8d only shown in FIG. 1, but the upper piece 8u, which is not shown, may preferably have a mated flange 14 with an end face formed to be inclined.

Now, let the distance between an OSA holder-regulating portion 9 side end face 13b of another positioning flange 13, and an entrance side end face 14b of another mated flange 14 thereopposite be α, then α=0, in other words, close contact is desirable. This is because close contact of the OSA holder 8 with the OSA holder-regulating portion 9 provides good positioning of the OSA holder 8, so that close contact of the receptacle 3 with the OSA holder 8 provides good positioning of the receptacle 3.

Here, let the distance from the end face 13b to end face 13a (i.e., the spacing between the two positioning flanges 13 and 13) in the receptacle 3 be A, the shortest optical-axial length of the mated flange 14 (i.e., the distance from the end face 14b to the upper end of the end face 14a) in the OSA holder 8B, and the longest optical-axial length (i.e., the distance from the end face 14b to the lower end of the end face 14a) in the OSA holder 8C, then $A \leq C$, $A \geq B$, $\alpha=0$ In this case, because the end face 14a is formed to be inclined, as the receptacle 3 is brought closer to the OSA holder 8 to fit the receptacle 3 onto the OSA holder 8, the positioning flange 13 comes into contact with the mated flange 14 to push the mated flange 14 into the entrance side. Thus the end face 14a is pressed against the end face 13b, thereby allowing ensuring α=0.

Third Embodiment

Figure 6:
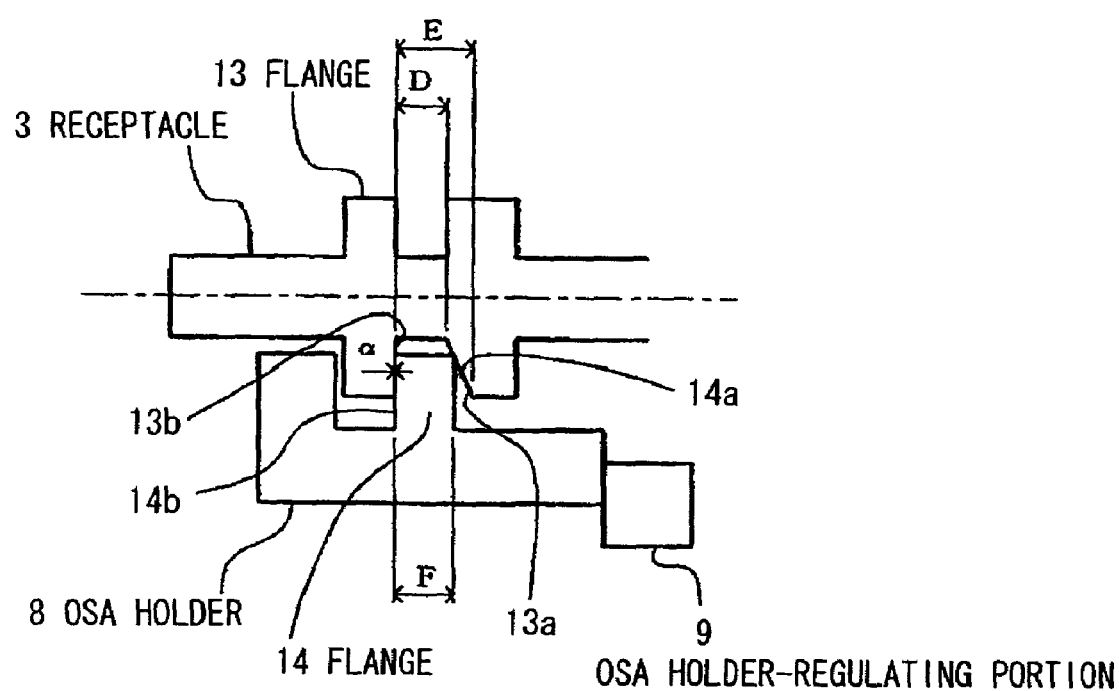
FIG. 6 is a sectional side view showing an OSA holder and an OSA in a third preferred embodiment of the invention.

FIG. 6 is a sectional side view showing an OSA holder and an OSA in the third preferred embodiment of the invention.

As shown in FIG. 6, two mated flanges 14 of an OSA holder 8 have end faces all perpendicular to the optical axis. But one of two positioning flanges 13 of a receptacle 3 has an entrance 6 side end face 13a that is formed to be inclined, so that the one positioning flange 13 is tapered. For this reason, the larger the distance from the axis of the receptacle 3 to an end face 14a of the mated flange 14, the larger the spacing between the end face 13a to the end face 14a gradually becomes.

Here, let the shortest distance from the end face 13b to end face 13a in the receptacle 3 be D, the longest distance from the end face 13b to the end face 13a in the receptacle 3E, and the optical-axial length of the mated flange 14 (i.e., the distance from the end face 14b to the end face 14a) in the OSA holder 8F, then $F \leq E$, $F \geq D$, $\alpha=0$ In the embodiment of FIG. 6, for the same reason as in the embodiment of FIG. 5, the distance between an OSA holder-regulating portion 9 side end face 13b of another positioning flange 13, and an entrance side end face 14b of a mated flange 14 thereopposite, $\alpha=0$ is desirable. And, because the end face 13a is formed to be inclined, it is possible to ensure $\alpha=0$.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An optical transceiver, comprising:
   an optical subassembly comprising a built-in optical element and a cylindrical receptacle to conduct an optical path from the optical element;
   a chassis comprising an entrance that allows insertion of an optical fiber to be connected to the optical path;
   an optical subassembly holder engaged with the receptacle to hold the optical subassembly and accommodated in contact with an inside portion of the chassis; and
   an optical subassembly holder-regulating portion formed in the chassis to regulate the optical subassembly holder, the optical subassembly holder-regulating portion being positioned opposite the entrance relative to the optical subassembly holder;
   wherein:
   the receptacle comprises a positioning flange, the optical subassembly holder comprises a mated flange to sandwich the positioning flange, and
   the mated flange comprises an inclined end face.

2. An optical transceiver, comprising:
   an optical subassembly comprising a built-in optical element and a cylindrical receptacle to conduct an optical path from the optical element;
   a chassis comprising an entrance that allows insertion of an optical fiber to be connected to the optical path;
   an optical subassembly holder engaged with the receptacle to hold the optical subassembly and accommodated in contact with an inside portion of the chassis; and
   an optical subassembly holder-regulating portion formed in the chassis to regulate the optical subassembly holder, the optical subassembly holder-regulating portion being positioned opposite the entrance relative to the optical subassembly holder;
   wherein:
   the receptacle comprises a positioning flange, the optical subassembly holder comprises a mated flange to sandwich the positioning flange, and
   the positioning flange comprises an inclined end face.

3. An optical transceiver comprising:
   an optical subassembly comprising a built-in optical element and a cylindrical receptacle to conduct an optical path from the optical element;
   a chassis comprising an entrance that allows insertion of an optical fiber to be connected to the optical path;
   an optical subassembly holder engaged with the receptacle to hold the optical subassembly and accommodated in contact with an inside portion of the chassis; and
   an optical subassembly holder-regulating portion formed in the chassis to regulate the optical subassembly holder, the optical subassembly holder-regulating portion being positioned opposite the entrance relative to the optical subassembly holder; and
   an elastic member interposed between the optical subassembly holder and the entrance,
   wherein the elastic member allows the optical subassembly holder to be pressed against the optical subassembly holder-regulating portion.

4. The optical transceiver according to claim 3, wherein: the elastic member comprises a metallic leaf spring.

* * * * *